LESTER V. CRAYCRAFT
*INVENTOR.*

BY *J. M. St. Amand*

ATTORNEY

June 22, 1965     L. V. CRAYCRAFT     3,190,110
MECHANICAL SPIKE PULSE FILTER FOR SHOCK MACHINE
Filed Nov. 26, 1962

LESTER V. CRAYCRAFT
*INVENTOR.*

BY *J. M. St. Amand*

*ATTORNEY*

United States Patent Office 3,190,110
Patented June 22, 1965

3,190,110
MECHANICAL SPIKE PULSE FILTER FOR SHOCK MACHINE
Lester V. Craycraft, Riverside, Calif., assignor to the United States of America as represented by the Secretary of the Navy
Filed Nov. 26, 1962, Ser. No. 240,182
5 Claims. (Cl. 73—12)
(Granted under Title 35, U.S. Code (1952), sec. 266)

The invention herein described may be manufactured and used by or for the Government of the United States of America for governmental purposes without the payment of any royalties thereon or therefor.

The present invention relates to shock machines, especially those of drop table design producing square waves, and more particularly to a mechanical filter for eliminating the effects of spike accelerations produced by such shock machines.

Shock testing of test specimens is performed on many types of shock machines producing various types of shock pulses. To produce square wave shock pulses with a fast rise time of one millisecond or less a drop tower is normally used. A very good square wave shock with a fast rise time is produced by dropping the carriage of such a drop tower on to an anvil from a predetermined height. A steel pin attached to the underside of the carriage strikes and penetrates a lead pellet placed on the anvil, and the dwell time is controlled by the depth of penetration of the pin into the lead pellet. However, at the time of impact of the steel pin with the lead pellet, "spike" accelerations of many times the amplitude of the desired shock pulse are also produced. High frequency peak accelerations are generated by most shock machines where square wave tests with fast rise times are produced. These unwanted high frequency peak accelerations are referred to as "spikes."

If the square wave pulse is monitored and recorded with a low frequency accelerometer (strain gauge type) and amplifier system, the high frequency "spikes" will not be observed on the recording; however, this method does not reduce the effects of the spike acceleration on the specimen attached to the carriage. Also, if a crystal accelerometer or other high frequency type monitoring device is used to record the shock pulse, the "spike" accelerations may be eliminated from the recorded output by using electronic filters, but this type of filtering does not reduce the "spikes" applied to the specimen. Further, the "spike acceleration" amplitudes may be reduced by tapering the steel pin at the point of impact with the lead pellet, but this also is disadvantageous in that it increases the rise time.

A purpose of the present invention is to minimize or eliminate the effects of the "spike" accelerations on a specimen while maintaining the desired square wave shock pattern. The present invention eliminates the effects of "spike" accelerations on a specimen by providing an isolator means attached to the carriage of a drop tower or the like. A plate, to which a specimen is attached, and the isolator are carried on the carriage of a typical drop tower such that the isolator filters most of the "spikes" from the adapter plate. The rise time of the pulse can be controlled by providing a tapered steel pin beneath the carriage which strikes and penetrates a lead pellet placed on an anvil.

It is an object of the invention, therefore, to provide a mechanical filter for eliminating the effects of shock machine produced "spike" accelerations on a specimen being tested while maintaining a desired square wave shock pulse.

Another object of the invention is to provide a mechanical filter for isolation of "spike" accelerations produced by shock machines.

A further object of the invention is to provide a true picture of a shock pulse by recording shock pulses with a crystal accelerometer without electronic filtering of the output signal.

Other objects and many of the attendant advantages of this invention will become readily appreciated as the same becomes better understood by reference to the following detailed description when considered in connection with the accompanying drawings wherein.

Figure 4A:
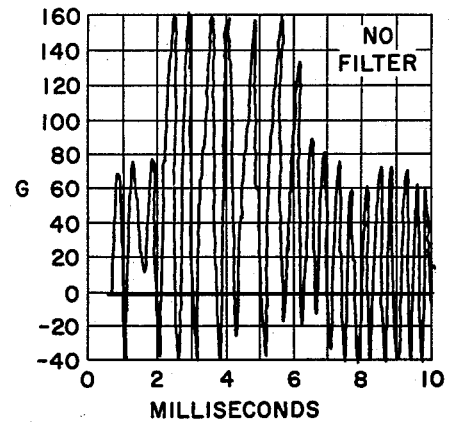
FIG. 4A illustrates a recording of a shock produced square wave pulse without any filtering.
Figure 5A:
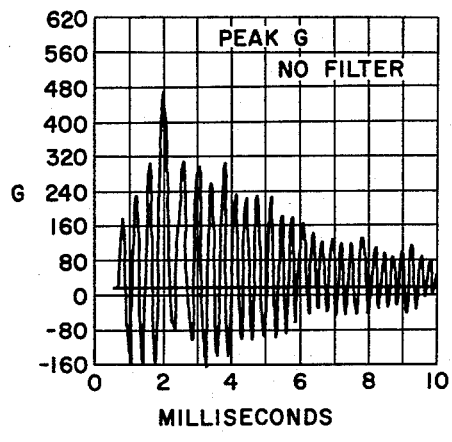

FIGS. 5A and B show the pulses of FIGS. 4A and B with a gain of scope reduced by a factor of 4.

Figure 6A:
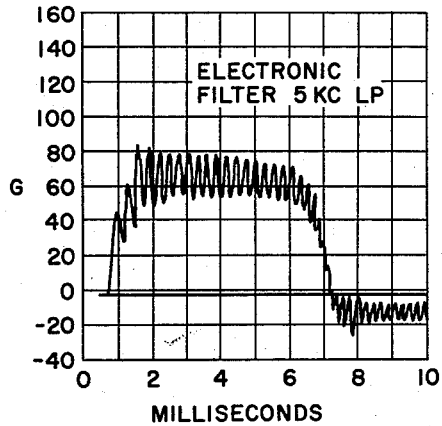

FIGS. 6A and B also show the same pulses as in FIGS. 4A and B, but with the output signals from the accelerometer fed through an electronic filter.

Figure 1:
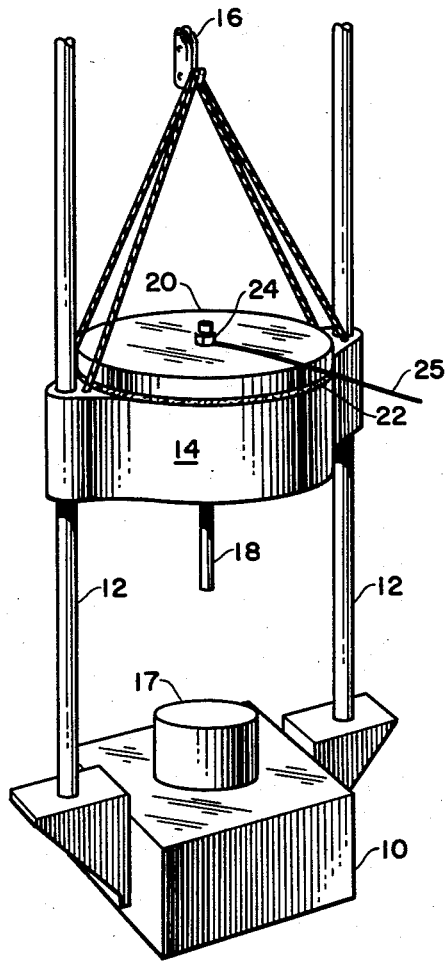
FIG. 1 illustrates a typical drop tower shock machine.
Figure 2:
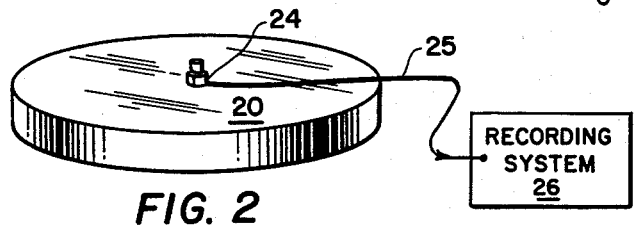
FIG. 2 shows an adapter plate having a crystal accelerometer attached thereto.
Figure 3:
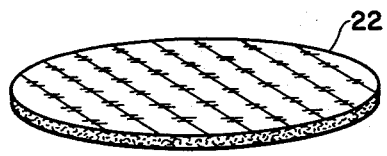
FIG. 3 shows an isolator which separates the adapter plate from the drop tower carriage.

The drop tower illustrated in FIG. 1 shows an anvil 10 at the base, a pair of guide rails 12 mounted on either side of the anvil, and a carriage 14 which guides on the rails. A release means 16 holds the carriage at its elevated position until it is allowed to drop to the anvil. Carriage 14 carries a pin 18 attached to the underside thereof for piercing a pellet 17 of lead, for example, when the carriage is dropped. The upper surface of the carriage has an adapter plate 20 mounted thereon for carrying a specimen to be tested. Between the carriage and adapter plate is mounted an isolator pad 22 of cork, or the like, and a high frequency crystal accelerometer 24, or the like, is attached to adapter plate 20. An electrical lead 25 connects accelerometer 24 to a recorder 26 such as an oscilloscope and camera or the like. The adapter plate FIG. 2 and isolator FIG. 3 form the mechanical filter for the drop tower carriage. Plate 20 and isolator 22 may be attached to the carriage with a fast drying cement, and a number of mounting holes may be provided in the plate for attaching a specimen thereto.

In operation, when the carriage carrying a specimen is dropped the steel pin 18 will strike the lead pellet 17 and "spike" accelerations will be transmitted through pin 18 to carriage 14. Isolator 22, however, filters out most of the "spikes" from reaching the adapter plate to which the specimen is attached.

Figure 4B:
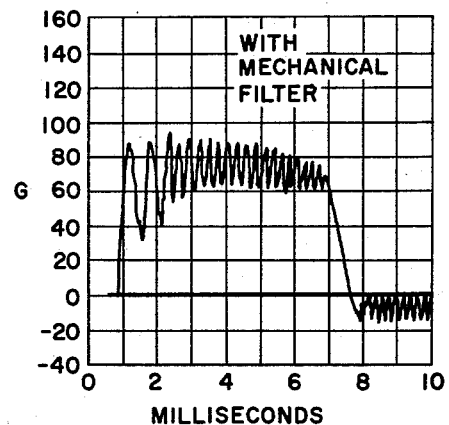
FIG. 4B shows a recording of the pulse of FIG. 4A using the mechanical filter of the present invention.
Figure 5B:
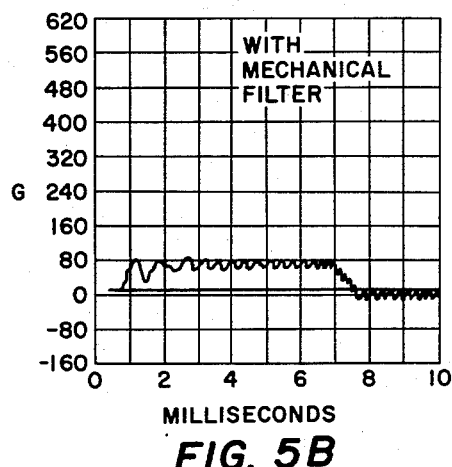
Figure 6B:
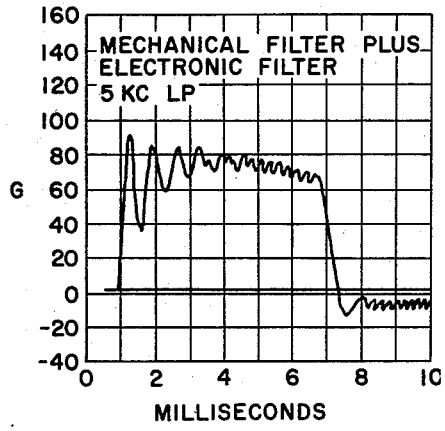

Recordings of square wave pulses using the aforementioned equipment (crystal accelerometer, oscilloscope and camera) are shown in FIGS. 4–6 for pulses with and without filtering. FIG. 4A shows a recording of a 70g, 6 millisecond square wave pulse with the accelerometer attached to the carriage and with no filtering of any kind; FIG. 4B shows the same pulse with the accelerometer attached to the adapter plate and with isolator 22 between plate 20 and carriage 14. FIGS. 5A and B also show the 70g, 6 millisecond pulse but with a gain of scope reduced by a factor of 4. As shown in FIGS. 5A and B, the basic square wave shock is 70g while the "spike" acceleration amplitudes are 700g peak-to-peak and higher. FIGS. 6A and B are the same signals as in FIGS. 4A and B with the output signals from the accelerometer fed through a 5 kc. electronic filter.

From the foregoing it is apparent that with the present invention "spike" accelerations applied to a specimen are reduced by a factor of 10 to 1 when the specimen is subjected to square wave shocks.

Most military specifications for square wave shocks specify a tolerance of ±10 to 20% in the maximum amplitude of acceleration. Since most electronic packages are monitored for proper operation during shock tests a component may pass the specified square wave shock but fire or trigger a circuit due to "spike" accelerations, which could result in specimen rejection and unwarranted delays in production or development of components. Use of the present invention will isolate most "spikes" as shown by FIGS. 4B and 5B thus permitting better monitoring of specimens.

Obviously many modifications and variations of the present invention are possible in the light of the above teachings. It is therefore to be understood that within the scope of the appended claims the invention may be practiced otherwise than as specifically described.

What is claimed is:

1. In a shock machine of the drop carriage design, for producing square waves and the like having an anvil base, vertical guide rails and drop carriage upon which specimens to be shock tested are mounted, the improvements for eliminating the effects of undesirable spike accelerations on the test specimens comprising:
    (a) an adapter plate mounted on said drop carriage upon which a specimen to be tested can be attached thereto,
    (b) an isolator filter pad mounted in between and separating said adapter plate from the carriage,
    (c) an accelerometer attached to said adapter plate the output of which is used for recording the shock wave transmitted to said adapter plate and any specimen mounted thereon,
    (d) said adapter plate and isolator pad forming a mechanical filter for the drop carriage for filtering out unwanted spike accelerations while maintaining the desired high rise time shock pulse pattern.

2. In a shock machine of the drop carriage design, for producing square waves and the like having an anvil base, vertical guide rails and drop carriage upon which specimens to be shock tested are mounted, the improvement for eliminating the effects of spike accelerations on the test specimens comprising:
    (a) an isolator filter pad mounted on the top side of said drop carriage,
    (b) an adapter plate mounted on the top of said isolator pad for attaching a test specimen thereto,
    (c) said isolator pad completely separating said adapter plate from said carriage,
    (d) a high frequency monitoring means attached to said adapted plate for recording shock waves transmitted from said carriage and through said isolator to said adapter plate and any test specimen thereon when said carriage is dropped and strikes the anvil base of the shock machine;
    (e) said adapter plate and isolator pad forming a mechanical filter for the drop carriage for preventing the unwanted spike accelerations from being transmitted from the carriage to the specimen while maintaining the desired high rise time shock pulse pattern.

3. A device as in claim 2 wherein said isolator pad is made from cork.

4. In a shock machine of the drop carriage design, for producing square waves and the like having an anvil base, vertical guide rails and drop carriage upon which specimens to be shock tested are mounted, the improvement for eliminating the effects of spike accelerations on the test specimens comprising:
    (a) an isolator filter pad mounted on the top side of said drop carriage,
    (b) an adapter plate mounted on the top of said isolator pad for attaching a test specimen thereto,
    (c) said isolator pad completely separating said adapter plate from said carriage,
    (d) a high frequency transmitting steel pin attached to the underside of said carriage for striking and penetrating a lead pellet on the anvil base when the carriage is dropped,
    (e) a monitoring means attached to said adapter plate for recording shock waves transmitted from said carriage and through said isolator to said adapter plate and any test specimen thereon when said carriage is dropped and strikes the anvil base of the shock machine,
    (f) said adapter plate and isolator pad forming a mechanical filter for the drop carriage for preventing the unwanted spike accelerations from being transmitted from the carriage to the specimen while maintaining the desired square wave shock pattern.

5. A mechanical filter for a shock machine having a table to which test specimens are attached for shock testing, comprising:
    (a) an isolator filter pad mounted on said table,
    (b) an adapter plate mounted on top of said isolator pad for attaching test specimens thereto,
    (c) said isolator pad completely separating said adapter plate from said table,
    (d) monitoring means attached to said adapter plate for recording shock waves transmitted from said shock machine table through said isolator pad to said adapter plate and any test specimen thereon,
    (e) said adapter plate and isolator pad forming a mechanical filter for the drop carriage for preventing unwanted spike accelerations from being transmitted from said table to the test specimen while maintaining the desired high rise time shock pulse pattern.

References Cited by the Examiner

UNITED STATES PATENTS

| | | | |
|---|---|---|---|
| 2,982,122 | 5/61 | Shatz et al. | 73—12 |
| 3,100,982 | 8/63 | Cutler | 73—12 |
| 3,100,983 | 8/63 | De Vost | 73—12 |

OTHER REFERENCES

Barry Products Bulletin 533, Barry Controls Inc., Watertown, Mass., 4 pages.

Journal Acoustical Soc. AM., vol. 28, No. 5, September 1956, article by Morrow et al. pages 959–965.

RICHARD C. QUEISSER, *Primary Examiner.*

DAVID SCHONBERG, *Examiner.*